(12) United States Patent
Dundar et al.

(10) Patent No.: US 7,840,091 B2
(45) Date of Patent: Nov. 23, 2010

(54) SIGNAL SOURCE DATA INPUT FOR RADIO FREQUENCY PLANNING

(75) Inventors: Baris Dundar, San Pablo, CA (US); Raymond Rui-Feng Liao, Pleasanton, CA (US)

(73) Assignee: Siemens Aktiengesellschaft, München ( * ) Notice: Subject to any disclaimer, the term of this patent is extended or adjusted under 35 U.S.C. 154(b) by 0 days.

(21) Appl. No.: 12/414,389

(22) Filed: Mar. 30, 2009

(65) Prior Publication Data

US 2010/0245357 A1      Sep. 30, 2010

Related U.S. Application Data

(62) Division of application No. 11/361,142, filed on Feb. 23, 2006, now Pat. No. 7,583,855.

(51) Int. Cl.
G06K 9/36         (2006.01)
(52) U.S. Cl. ................... 382/276; 706/919; 715/964
(58) Field of Classification Search ............. 382/276; 700/182; 706/919; 715/964
See application file for complete search history.

(56) References Cited

U.S. PATENT DOCUMENTS

| | | | |
|---|---|---|---|
| 5,394,522 A | 2/1995 | Sanchez-Frank et al. | |
| 5,450,615 A | 9/1995 | Fortune et al. | |
| 5,640,002 A | 6/1997 | Ruppert et al. | |
| 5,686,705 A | 11/1997 | Conroy et al. | |
| 5,732,077 A | 3/1998 | Whitehead | |
| 5,936,203 A * | 8/1999 | Ryman ................. | 174/109 |
| 5,949,988 A | 9/1999 | Feisullin et al. | |
| 5,953,669 A | 9/1999 | Stratis et al. | |
| 6,059,842 A | 5/2000 | Dumarot et al. | |
| 6,119,009 A | 9/2000 | Baranger et al. | |
| 6,317,599 B1 | 11/2001 | Rappaport et al. | |
| 6,330,429 B1 | 12/2001 | He | |
| 6,336,035 B1 | 1/2002 | Somoza et al. | |
| 6,337,688 B1 | 1/2002 | Berstis | |
| 6,338,031 B1 | 1/2002 | Lee et al. | |

(Continued)

FOREIGN PATENT DOCUMENTS

EP          1175115        1/2002

(Continued)

OTHER PUBLICATIONS

Iwama T, et al.: "Investigation of Propagation Characteristics above 1 GHz for Microcellular Land Mobile Radio"; May 6, 1990; pp. 396-400.

(Continued)

Primary Examiner—Matthew C Bella
Assistant Examiner—Gregory F Cunningham
(74) Attorney, Agent, or Firm—Donald B. Paschburg (57) ABSTRACT

A method includes displaying a reference polar coordinate system on a display screen, and displaying a radiation pattern image on the display screen in juxtaposition with the displayed reference polar coordinate system. In another aspect, an angled line is drawn on a display screen to represent the proposed layout of a leaky coaxial cable. A point of interest is selected that is spaced from the proposed cable layout, and one of the segments of the cable is determined as likely to produce a dominant level of irradiation with respect to the point of interest.

18 Claims, 10 Drawing Sheets

U.S. PATENT DOCUMENTS

| | | | |
|---|---|---|---|
| 6,360,107 | B1 | 3/2002 | Lin et al. |
| 6,393,290 | B1 | 5/2002 | Ufongene |
| 6,500,123 | B1 | 12/2002 | Holloway et al. |
| 6,522,888 | B1 | 2/2003 | Garceran et al. |
| 6,654,612 | B1 | 11/2003 | Avidor et al. |
| 6,759,979 | B2 | 7/2004 | Vashisth et al. |
| 6,885,191 | B1 | 4/2005 | Gleman |
| 7,299,168 | B2 | 11/2007 | Rappaport et al. |
| 7,379,829 | B2 | 5/2008 | Dundar et al. |
| 2003/0229478 | A1* | 12/2003 | Rappaport et al. ............ 703/13 |
| 2004/0181374 | A1 | 9/2004 | Rappaport et al. |
| 2006/0264172 | A1* | 11/2006 | Izumikawa et al. ........ 455/11.1 |
| 2007/0082677 | A1* | 4/2007 | Hart et al. ................ 455/456.1 |
| 2007/0106717 | A1 | 5/2007 | Dundar et al. |
| 2007/0197225 | A1 | 8/2007 | Dundar et al. |
| 2008/0075051 | A1 | 3/2008 | Dundar et al. |

FOREIGN PATENT DOCUMENTS

| | | |
|---|---|---|
| WO | WO 98/03025 | 1/1998 |
| WO | WO 99/30448 | 6/1999 |
| WO | WO 02/10942 | 2/2002 |

OTHER PUBLICATIONS

H. He J. McDowell & M. Conroy; "ASC coordinate transformation the pixlib library II" Astronomical Data Analysis Software Systems VII, APS Conference Series; vol. 145, 1998; pp. 1-4.

Florence Sagnard, "The Matlab Graphical Interface Ecamo", Internet Publication (online), Jul. 5, 2002, Retrieved from the internet: http://www.univ-mlv.fr/cmo/interfaces/ECAMO/fiche_ecamo_0801.pdf.

William C. Y. Lee: "Wireless and Cellular Communication (part)" Book, Oct. 22, 2005, pp. 396-402.

K.E. Oliver: "Introduction to Automatic Design of Wireless Networks"; ACM Crossroads 11.4: Mobile and Wireless Networking, (online) Jun. 2005, Retrieved from the internet: http://www.acm.org/crossroads/xrds11-4/automaticdesign.html>.

G. Bianchi, "Performance Analysis of the IEEE 802.11 Distributed Coordination Function", IEEE Journal of Selected Areas in Communication, 18(3), Mar. 2000, pp. 535-547.

A. Veres et al., "Supporting Service Differentiation in Wireless Frame Networks Using Distributed Control", IEEE Journal of Selected Areas in Communication, 19(10), Oct. 2001, pp. 2081-2093.

Steven J. Fortune, et al. "Wise Design of Indoor and Outdoor Wireless Systems: Practical Computation and Optimization", IEEE Computational Science & Engineering, Spring 1995, Lucent Bell Labs, pp. 58-68.

* cited by examiner

SIGNAL SOURCE DATA INPUT FOR RADIO FREQUENCY PLANNING

CROSS-REFERENCE TO RELATED APPLICATIONS

The present patent document is a divisional of U.S. Pat. No. 7,583,855, (Ser. No. 11/361,142) filed Feb. 23, 2006, which is hereby incorporated by reference.

BACKGROUND

Radio frequency (RF) planning is frequently a part of plans to deploy a large-scale wireless local area network (LAN). The purpose of RF planning is to ensure an adequate quality of RF signal coverage across the area in which the wireless LAN is to be deployed. Data to be considered for RF planning includes signal-to-noise ratio (SNR) and signal-to-noise-plus-interference ratio (SINR).

Conventional RF planning efforts generate data that indicates the locations of building features, relevant objects, and planned and/or existing sources of RF signals within a building. It may also be important for the planning process to take into account information regarding the radiation patterns of the signals provided by the signal sources. However, it can be inconvenient to provide such information as an input to the RF planning function.

SUMMARY

The present invention generally relates to planning of wireless communication networks. In particular, apparatus and methods are presented for inputting to an RF planning system information concerning the signal radiation patterns of signal sources.

According to some embodiments, a method, an apparatus and an article of manufacture that includes a computer usable medium containing computer readable program code are provided. The method steps and/or the steps performed by the apparatus and/or the steps called for by the computer readable program code include displaying a reference polar coordinate system on a display screen, and displaying a radiation pattern image on the display screen in juxtaposition with the displayed reference polar coordinate system.

In some embodiments, the method steps further include receiving input to indicate a location of the radiation pattern relative to the displayed polar coordinate system. The receiving step may include displaying a cursor at a boundary of the radiation pattern and, while displaying the cursor at the boundary, receiving an indication of actuation of a pointing device such as a mouse. The actuation may be clicking of a button on the mouse.

In another aspect, the method steps may include displaying a first polar coordinate system on a display screen; displaying a first radiation pattern image on the display screen, where the first radiation pattern image includes a second polar coordinate system and a first pattern region indicative of a radiation pattern generated by an antenna in a horizontal plane; scaling and moving the first radiation pattern image to bring the second polar coordinate system into coincidence with the first polar coordinate system; defining a scale for the first polar coordinate system to reflect a parameter of the first radiation image; marking points on a boundary of the first pattern region; deriving horizontal pattern data from the marked points; displaying a second radiation pattern image on the display screen together with the first polar coordinate system at a time when the first radiation pattern image is not displayed on the display screen, where the second radiation pattern image includes a third polar coordinate system and a second pattern region indicative of a radiation pattern generated by the antenna in a vertical plane; scaling and moving the second radiation pattern image to bring the third polar coordinate system into coincidence with the first polar coordinate system; defining a scale for the first polar coordinate system to reflect a parameter of the second radiation pattern image; marking points on a boundary of the second pattern region; deriving vertical pattern data from the points marked on the boundary of the second pattern region; and generating three-dimensional pattern data from the horizontal and vertical pattern data.

In some embodiments, the method steps further include providing the three-dimensional pattern data as an input to an RF planning function for a wireless data network. The steps for marking points may include clicking a mouse button when a cursor is located on the boundary of the first or second pattern region. The second radiation pattern image may be displayed after the marking of points on the boundary of the first pattern region, or the first radiation pattern image may be displayed after the marking of points on the boundary of the second pattern region.

In still another aspect, the method steps include using a computer-drawing function to draw, on a display screen, an angled line formed of a plurality of straight segments. The angled line represents a proposed layout of a leaky coaxial cable. Each segment represents a respective cable segment of the cable. The method steps further include selecting a point of interest spaced from the proposed layout of the cable, and determining which one of the cable segments is likely to produce a dominant level of irradiation with respect to the point in space.

In some embodiments, the determining step includes determining for each cable segment a shortest radio distance metric with respect to the point of interest. Determining the shortest radio distance metric includes determining a closest point on the cable segment in question to the point of interest. Determining the shortest radio distance metric further includes calculating first signal attenuation along the cable from a start point to the closest point on the cable segment, and calculating second signal attenuation resulting from spatial separation between the point of interest and the closest point on the cable segment in question.

In some embodiments, the method steps further include calculating an estimated effective received power level at the point of interest. The estimated effective received power level may be calculated by subtracting from an input power level at the start point: (a) the first signal attenuation along the cable from the start point to the closest point on the determined one of the cable segments; (b) the second signal attenuation resulting from spatial separation between the point of interest and the closest point on the determined one of the cable segments; and (c) a coupling loss constant for the cable. The method steps may also include providing the calculated estimated effective received power level as an input to an RF planning function for a wireless data network.

Further aspects of the instant system will be more readily appreciated upon review of the detailed description of the preferred embodiments included below when taken in conjunction with the accompanying drawings.

DETAILED DESCRIPTION OF SPECIFIC EMBODIMENTS

According to some embodiments, RF planning information is input into a computer using graphical user interfaces. One such interface, used to model a point-source antenna, allows an image representation of the antenna's radiation pattern to be superimposed on a reference polar coordinate system. By user input (e.g., via a mouse) the outline of the radiation pattern is indicated with reference to the reference polar coordinate system, and the resulting data is used by the computer as an input to an RF planning process for a wireless data network or the like.

Another such interface is used to model a leaky coaxial cable that may be proposed as a signal source in the wireless data network. A computer drawing tool allows the user to sketch a line-segment representation of the layout of the leaky coaxial cable. From this representation, the computer calculates estimated effective received power levels at points of interest in the area to be covered by the wireless data network.

With either or both of those data input techniques, inputting data to a computer for RF planning is simplified and made more convenient.

Figure 1:
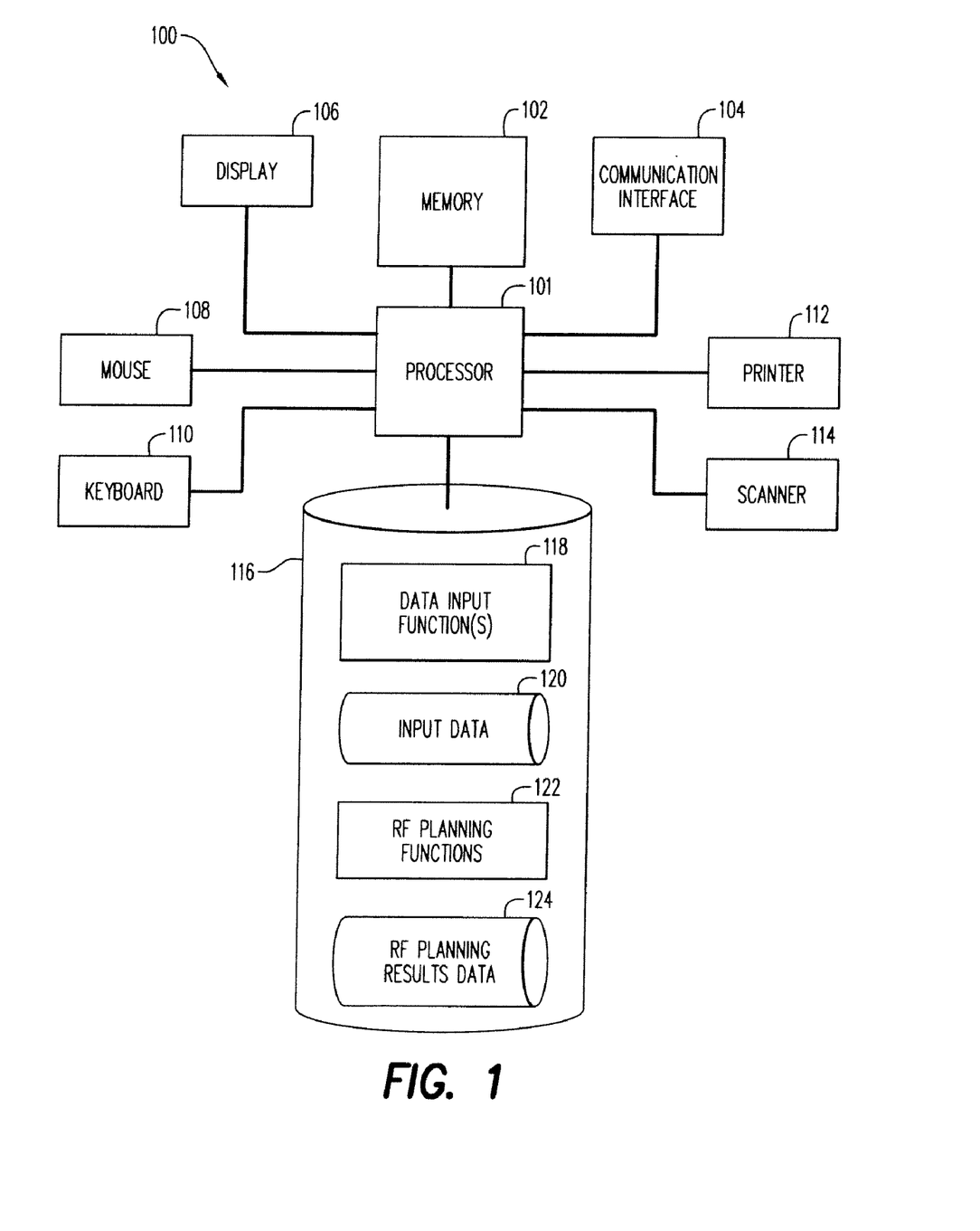
FIG. 1 is a block diagram of a computer in which the invention may be embodied.

FIG. 1 is a block diagram of a computer 100 as provided in accordance with some embodiments. The computer 100 may, for example, implement some or all of the RF planning data input functions described below. The computer 100 may, in some embodiments, be entirely conventional in terms of its hardware aspects. For example, the computer 100 may, in its hardware aspects and some of its software, be a conventional personal computer. As indicated in this paragraph and discussed further below, software may be provided to control the computer 100 in accordance with aspects of the present invention, and data may be stored and manipulated in the computer 100 in accordance with aspects of the present invention.

The computer 100 may include one or more processors 101, which may be a conventional microprocessor or microprocessors. Also included in computer 100 is memory 102 that is in communication with the processor 101. The memory 102 may be, in some embodiments, one or more of RAM, ROM, flash memory, etc., and may serve as one or more of working memory, program storage memory, etc.

In some embodiments, the computer 100 may also include a communication interface 104. The communication interface 104 may, for example, allow the computer 100 to access information via the Internet. In addition or alternatively, some or all of the data required for the processes described below may be provided to the computer 100 via one or more storage media such as floppy disks, CD-ROMs, etc. Media drives for such media may be included in the computer 100 but are not separately shown.

As seen from the drawing, the computer 100 may also include a number of different input/output devices, including devices needed to present a graphical user interface (GUI) to a user of the computer. In particular, the computer 100 may include a display screen 106, which may be, for example, a conventional flat panel display or CRT computer monitor. A further feature of the GUI, also included in the computer, is a conventional pointing device 108 such as a mouse, trackball, touchpad, etc. (As used herein and the appended claims, the term "mouse" shall be understood to include any one or more of the pointing devices referred to in the previous sentence.) The computer may further include a conventional computer keyboard 110, and a conventional printer 112, which may be used to print out results of an RF planning function to be described below.

A further peripheral device that may be part of the computer 100 is a conventional scanner 114. The scanner 114 may be used, for example, as a source of one or more antenna radiation pattern images that may be used, as described below, as part of the data entry function of the present invention.

Also included in the computer 100, and in communication with the processor 101, is a mass storage device 116. Mass storage device 116 may be constituted by one or more magnetic storage devices, such as hard disks, one or more optical storage devices, and/or solid state storage. The mass storage 116 may store software 118 which controls the computer 100 to present a GUI by which a user may enter data to be used in an RF planning process. The resulting data may be stored in one or more data storage structures 120 maintained in the mass storage 116. The mass storage 116 may also store software 122 to perform RF planning functions utilizing the data stored at 120. In addition, other software, which is not represented in the drawing, may be stored in the mass storage 116, including operating system software and/or other applications that allow the computer 100 to perform other functions in addition to RF planning and the inputting of data used in RF planning. Still further, the mass storage 116 may store one or more data storage structures 124 to store the data which results from operation of the RF planning software. In practice the functions described herein may all be performed in one computer or may be divided among two or more computers that may be in communication with each other and/or may exchange data via removable memory devices such as floppy disks, CD-ROMs, etc. It will be appreciated that all of the software referred to above may be temporarily stored in memory 102 and fetched instruction-by-instruction by the processor 101 to program the processor 101. The software may also be referred to as "program instructions" or "computer readable program code".

Figure 2:
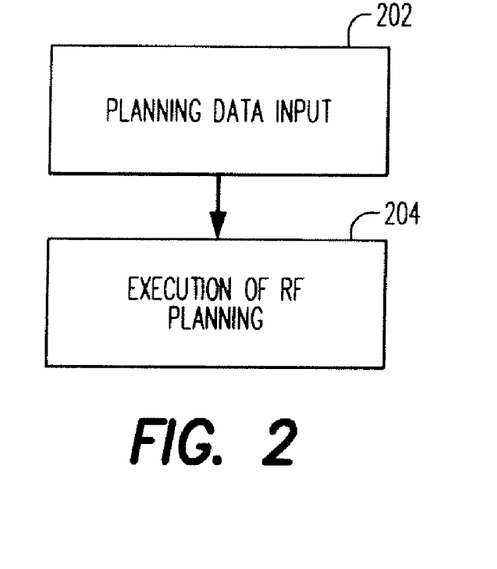
FIG. 2 is a high level flow chart that illustrates a process that may be performed in the computer of FIG. 1.

FIG. 2 is a high level flow chart that illustrates a process which may be performed in the computer 100. At 202, data required for performing an RF planning function (e.g., for planning the locations and types of components of a wireless LAN) is input. At least some portions of the data input at step 202 may be performed in accordance with principles of the present invention. At 204, the data provided at 202 is used as an input for the RF planning function, which may generally be carried out in accordance with conventional practices.

Figure 3:
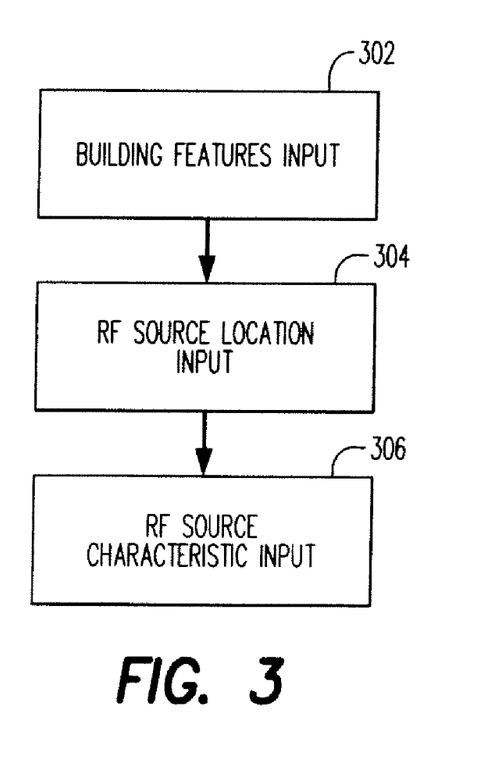
FIG. 3 is a flow chart that shows some details of the process of FIG. 2.

FIG. 3 is a flow chart that shows some details of the data input process of FIG. 2. At 302, data concerning a building or buildings in which the network is to be installed is provided to the computer 100. The data may include the compositions and locations of building features such as walls, floors, fixed items of equipment, etc. Inputting of this data to the computer 100 may be performed in accordance with conventional practices. At 304, the user inputs to computer 100 the proposed locations of RF signal sources such as point source antennas and/or leaky coaxial cables that may in effect serve as antennas. In part (e.g. as to point source antennas) this location data input step may be performed in a conventional manner. In other respects (e.g., as to leaky coax) this location data input step may be performed in accordance with principles of the present invention, in a manner to be described below.

At 306, the user inputs to computer 100 characteristics of the RF signal sources. At least in part, this step may be performed in accordance with principles of the present invention, as described below.

Figure 4:
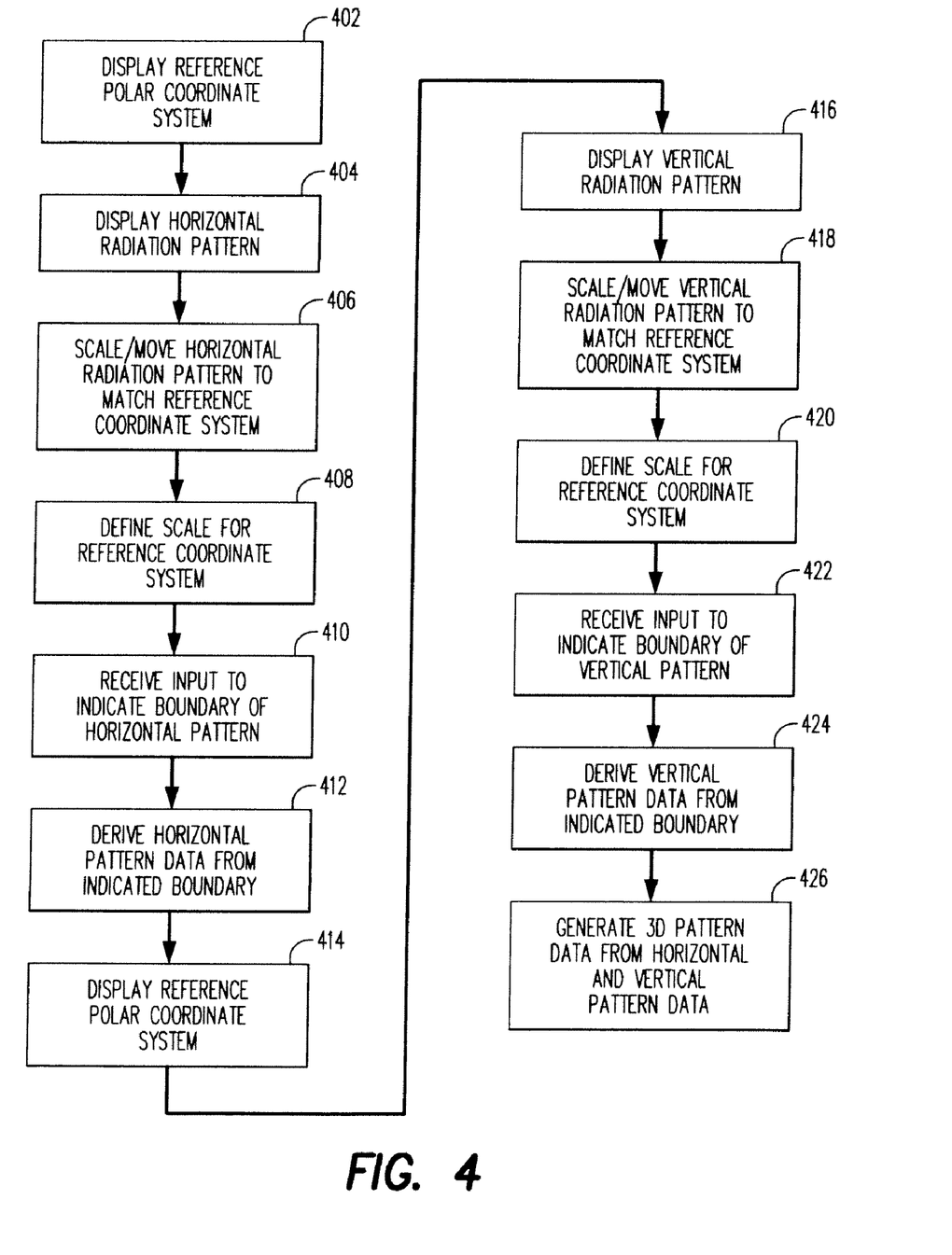
FIG. 4 is a flow chart that shows further details of the process of FIGS. 2 and 3.
Figure 5:
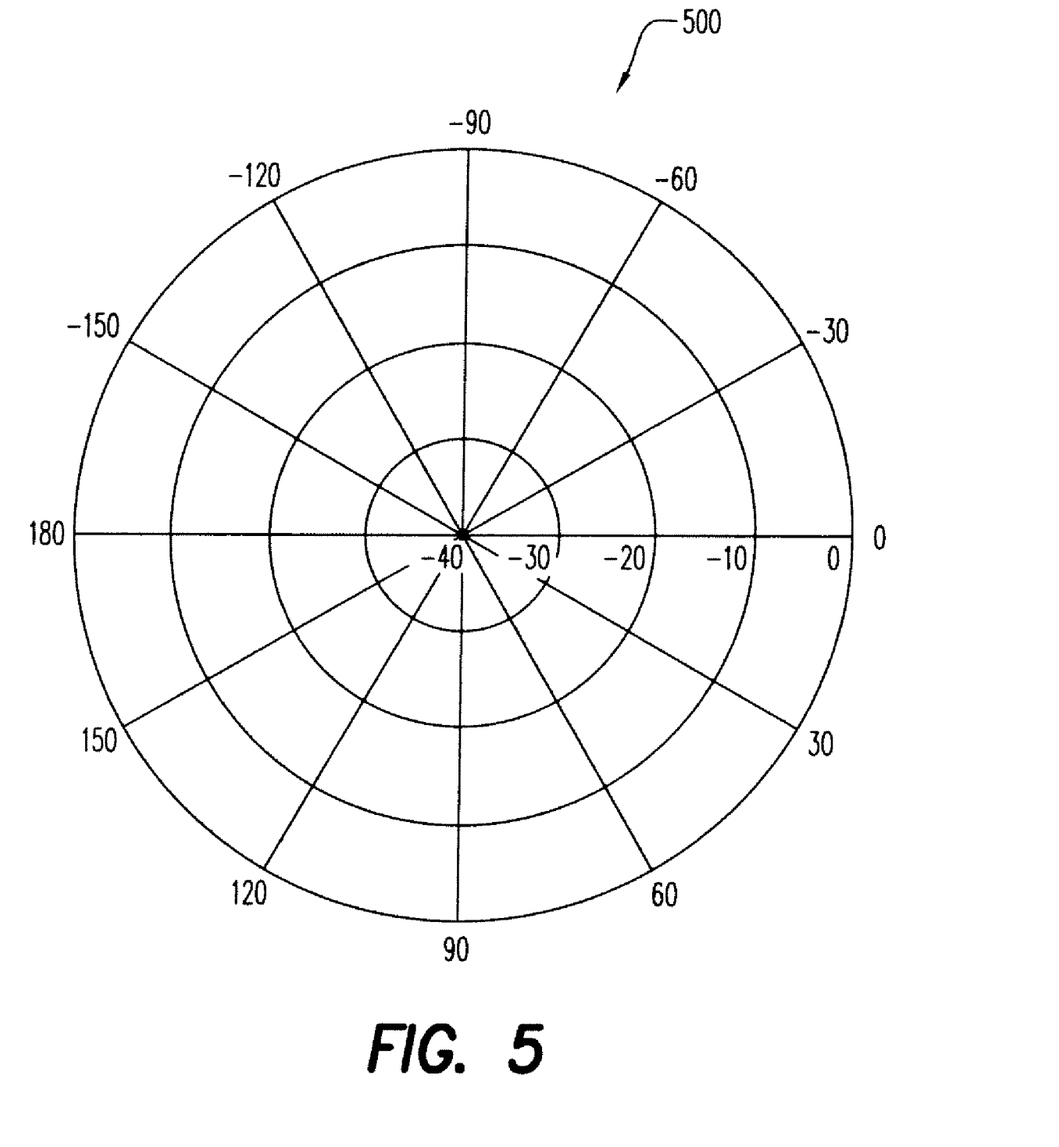
FIGS. 5-8 illustrate portions of a graphical user interface that may be displayed by the computer of FIG. 1 as a part of the process of FIG. 4.
Figure 6:
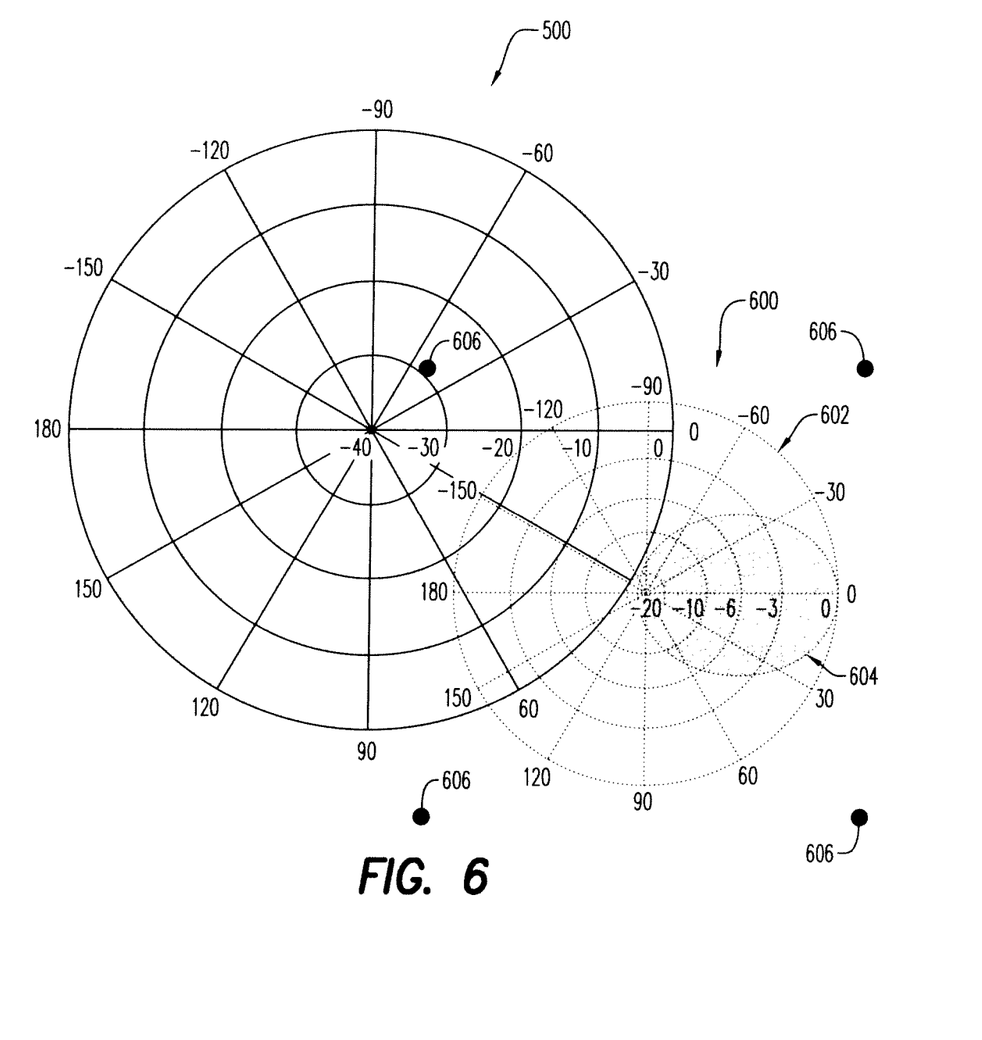

FIG. 4 is a flow chart that shows further details of the process of FIGS. 2 and 3. In particular, FIG. 4, with its accompanying illustrations in FIGS. 5-8, shows how data concerning characteristics of directional and/or omnidirectional access points/base stations/antennas may be entered into the computer 100 in regard to step 306 (FIG. 3) and in accordance with aspects of the invention. At 402, a reference polar coordinate system 500 (FIG. 5) is displayed on display 106 (FIG. 1) as at least a portion of a GUI for RF planning data input. As will be appreciated by those who are skilled in the art, the reference polar coordinate system allows the locations of particular points in a plane to be represented as a coordinate pair (θ, r), where θ represents the angular direction from the origin and r represents the distance from the origin.

Continuing to refer to FIG. 4, at 404 an image 602 (FIG. 6) that represents a radiation pattern characteristic of an antenna/access point/base station is displayed on the display 106 simultaneously with the reference polar coordinate system 500. It will be observed that the radiation pattern image 600 includes two parts: a polar coordinate system 602 and a pattern region 604. The pattern region 604 indicates, relative to the polar coordinate system 602, a radiation pattern generated by the antenna/access point/base station. For example, the radiation pattern indicated by the pattern region 604 may be in a horizontal plane. Data which represents the radiation pattern image 600 may have been loaded into the computer 100 in a number of ways. For example, the radiation pattern image may have been scanned from an antenna data sheet or catalog or the like using the scanner 114 to produce a bitmap or jpeg file of the radiation pattern image. Alternatively, the radiation pattern image may have been downloaded to the computer 100 from a manufacturer's website or loaded into the computer 100 via a removable medium such as a floppy disk, CD ROM or ZIP disk. In some embodiments, the radiation pattern image file, however loaded into the computer 100, may be opened, and the radiation pattern image may be copied, and then pasted into the same window with the reference polar coordinate system 500. The opening, copying and pasting operation may be performed by the user in response to a suitable prompt (not shown) issued by the computer 100 upon the displaying of the reference polar coordinate system 500.

Figure 7:
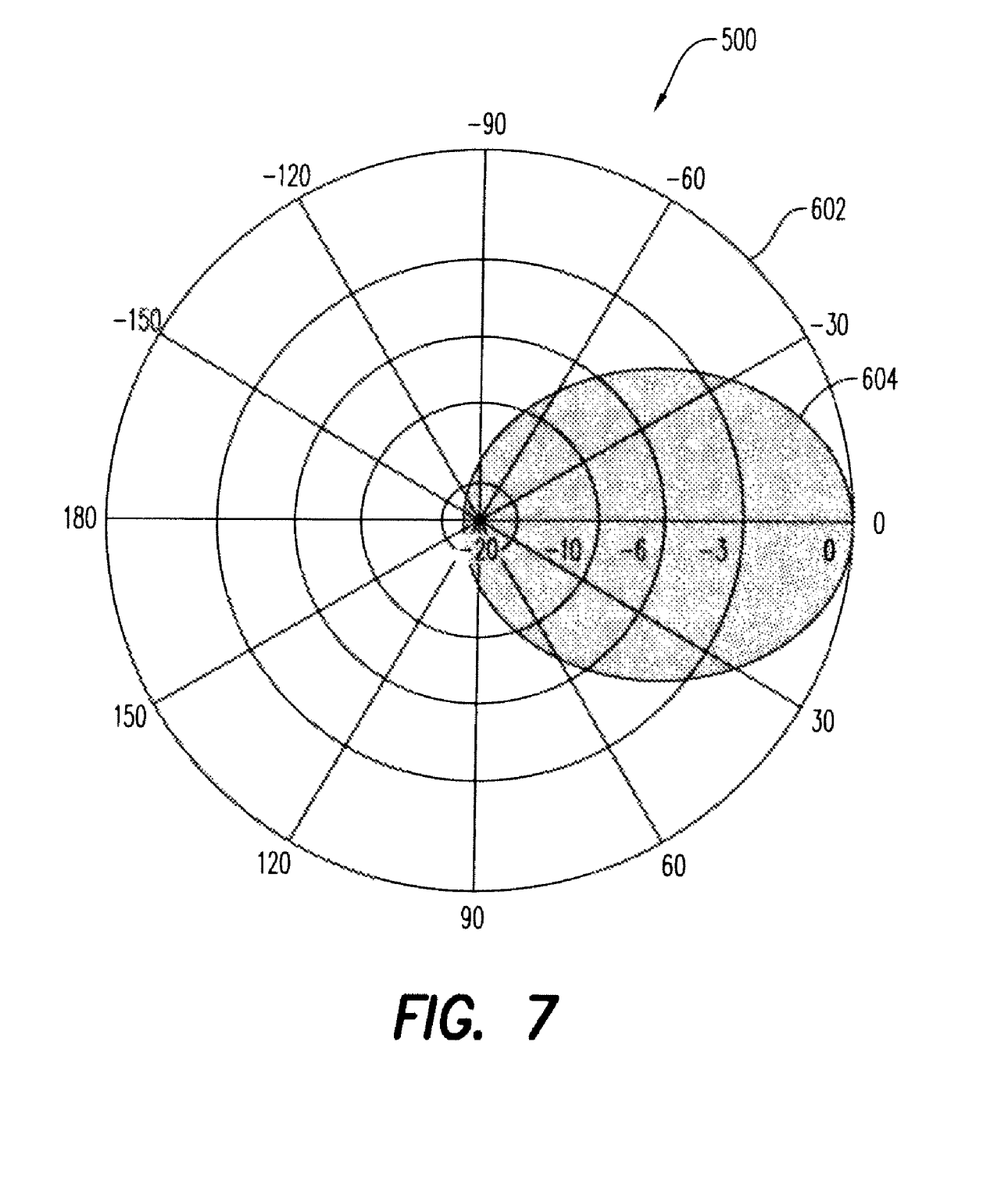
Figure 8:
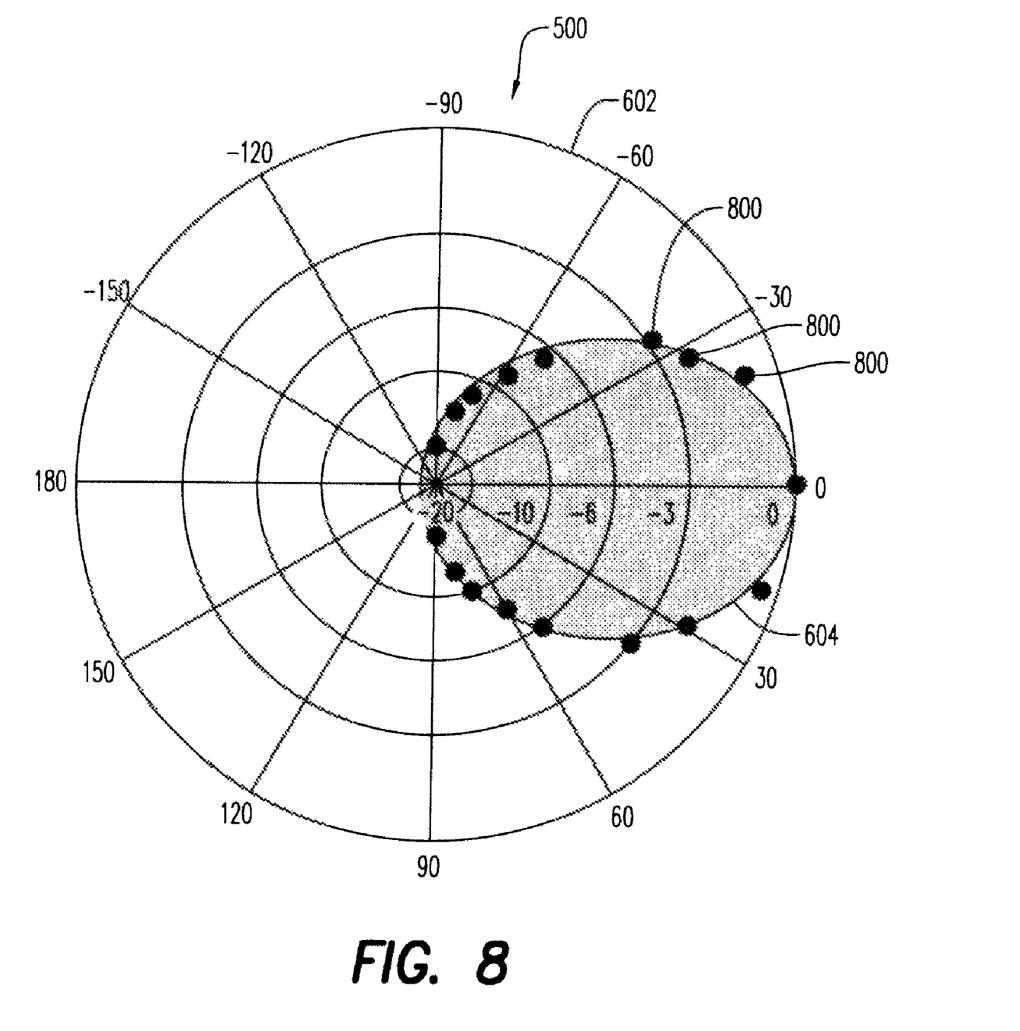

Like a typical object in a drawing application image, the radiation pattern image 600 may be "dragged", i.e., moved from one place to another in the image plane by manipulating a cursor (not shown) using the mouse 108. In addition, the radiation pattern image 600 includes "handles" 606 which may be manipulated by the cursor and the mouse 108 to "scale" (i.e., to change the size of) the radiation pattern image 600. As indicated at 406 in FIG. 4, the user moves and scales the radiation pattern image 600 so that the polar coordinate system 602 of the radiation pattern image 600 is brought into coincidence with the reference polar coordinate system 500. (As used herein and in the appended claims, two coordinate systems are "in coincidence with" each other if the two coordinate systems exactly coincide with each other in position on a display screen.) The resulting screen display (or a portion thereof) is shown in FIG. 7. It should be recognized that the reference polar coordinate system may be provided as a background object in the composite image illustrated in FIGS. 6 and 7, with the radiation pattern image having a degree of transparency such that the reference polar coordinate system is visible through the radiation pattern image; alternatively, the reference polar coordinate system may be a foreground object with a degree of transparency such that the radiation pattern image is visible through the reference polar coordinate system.

At 408 in FIG. 4, the scale of the r axes of the reference polar coordinate system is defined so as to match the scale of the r axes of the polar coordinate system of the radiation pattern image. For example, a suitable line-drawing tool (not shown) may be used to define a length of line that corresponds to a suitable distance/attenuation scale of the polar coordinate system of the radiation pattern image.

At 410 in FIG. 4, the user uses the cursor/mouse to mark points 800 on the boundary of the pattern region 604 of the radiation pattern region. The points may be marked by the user positioning the cursor (not shown) at various points along the boundary of the pattern region, and clicking (e.g., once or twice) a button on the mouse at the times when the cursor is located on the boundary. The marked points may be indicated by small circles in a contrasting color, such as red. In this way, the user indicates to the computer 100 the location of the pattern region and the corresponding radiation pattern, relative to the reference polar coordinate system. In some embodiments, a tool or tools may be provided to allow the user to move or delete existing points and/or to add new ones. When the user has completed his or her tracing or outlining of the pattern region with the marked points, he/she may actuate a "submit" button (not shown) or the like in the GUI to indicate completion of entry of data with respect to the (in this case horizontal) radiation pattern. Based on the display data points represented by the marked points, the computer 100 may generate a closed curve, and from that curve may derive (step 412) numerical data to represent the (in this case horizontal) radiation pattern of the antenna/access point/base station in question.

The process illustrated by steps 402-412 may be repeated (steps 414-424) with respect to another radiation pattern image, in this case representing the radiation pattern of the antenna/access point/base station in a vertical plane. To all intents and purposes the illustrations in FIGS. 5-8 may also be taken to illustrate steps 414-424, with the proviso that the pattern region for the vertical radiation pattern image may differ in shape and/or size from the pattern region for the horizontal radiation pattern image. It will further be noted that the vertical radiation pattern image may be displayed simultaneously with the reference polar coordinate system at a time when the horizontal radiation pattern image is not displayed.

At 426, the computer 100 may generate three-dimensional radiation pattern data for the antenna/access point/base station from the horizontal pattern data derived at step 412 and from the vertical pattern data derived at step 424. The generation of the three-dimensional pattern data may be done, for example, by a conventional interpolation technique.

The resulting three-dimensional pattern data may be used as an input to the RF planning function represented at 204 in FIG. 2. For example, the three-dimensional pattern data may be used in RF signal propagation simulations using conventional ray tracing techniques.

It should be understood that the inputting of the vertical pattern data may precede, instead of following, the inputting of the horizontal pattern data.

Figure 9:
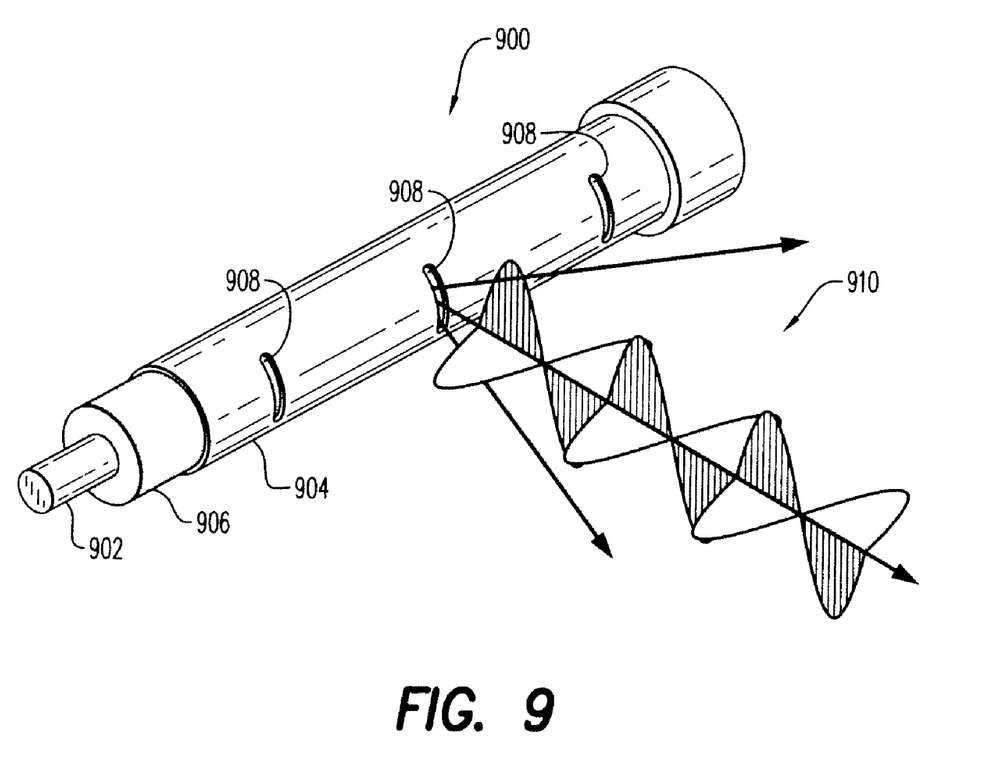
FIG. 9 is a partial schematic illustration of a "leaky" coaxial cable that may be modeled in the process of FIGS. 2 and 3.

FIG. 9 is a partial schematic illustration of a "leaky" coaxial cable 900 that may be modeled in the process of FIGS. 2 and 3. As is customary for a coaxial cable, the cable 900 includes a central conductor 902 and an outer conductive shield 904, with a dielectric component 906 that is between the conductor 902 and the shield 904 and that has an annular cross-section. To render the cable 900 "leaky" (and therefore functional as an antenna that can provide signal coverage for an extensive and/or irregularly shaped area), the shield includes openings 908 from which the signal (schematically indicated at 910) may emanate. In various conventional types of leaky coaxial cables, the openings in the shield may have various shapes, sizes and distributions along the cable and/or around the circumference of the cable.

Figure 10:
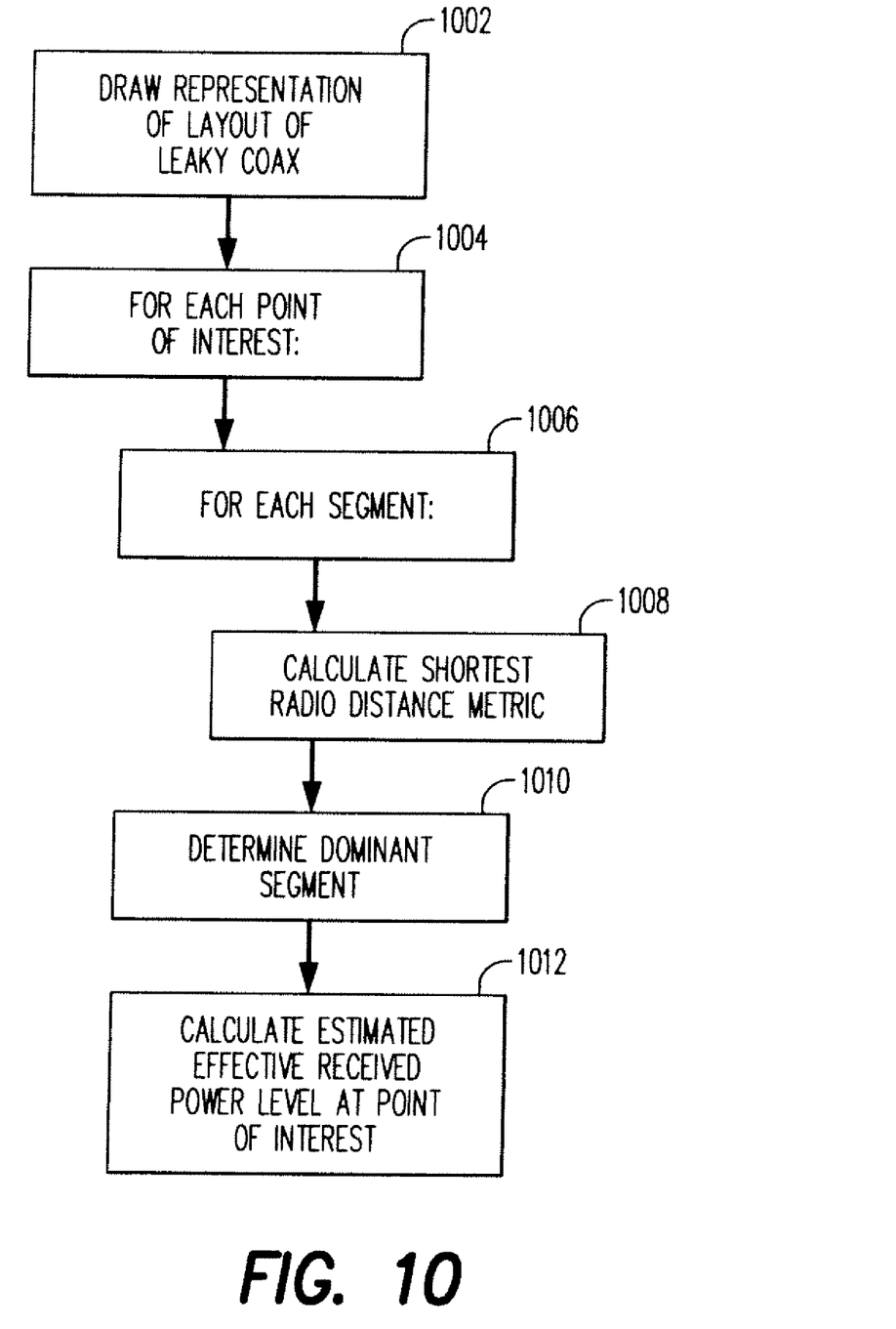
FIG. 10 is a flow chart that shows further details of the process of FIGS. 2 and 3.

FIG. 10 is a flow chart that shows further details of the process of FIGS. 2 and 3, as the same may be performed when a leaky coaxial cable is to be included in a wireless network or the like.

At 1002 in FIG. 10, a computer drawing tool may be employed with the computer 100 to indicate to the computer (and particularly to the RF planning software 122), a proposed layout for a leaky coaxial cable to be used in a wireless network. The computer drawing tool may be part of the data input function 118. The computer drawing tool may be operable (with a mouse, e.g.) in a similar fashion to a straight-line drawing tool included in a conventional computer drawing software package.

Figure 11:
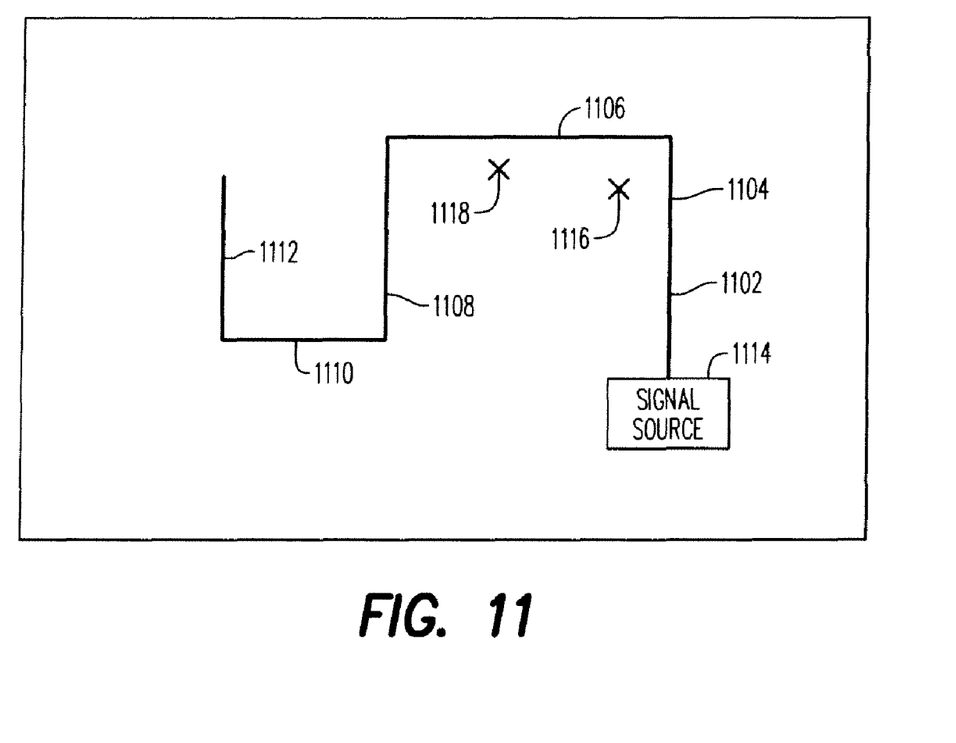
FIG. 11 illustrates portions of a graphical user interface that may be displayed by the computer of FIG. 1 as part of the process of FIG. 10.

FIG. 11 illustrates portions of a graphical user interface that may be displayed by the computer 100 (i.e., by display 106) in conjunction with step 1002. An angled line 1102 may be displayed as drawn by the user to represent the proposed layout of the leaky coaxial cable. The angled line 1102 may be superimposed on a map (not shown in the drawing) of a floor of a building in which the wireless network is to be installed.

The angled line 1102 may be formed of a number of straight line segments (in this particular example, line segments 1104, 1106, 1108, 1110 and 1112). Each of the line segments 1104, 1106, 1108, 1110, 1112 may represent, and indicate the location of, a respective segment of the leaky cable represented by the angled line 1102.

In addition, as part of the data entry process, and in representing the layout of the leaky cable, the user may indicate, with a suitable drawing tool from the data input function software 118 (FIG. 1), the proposed location of a signal source (represented at 1114 in FIG. 11) which is to inject the signal into the leaky cable. The location of the signal source is the point (sometimes referred to herein as the "start point") from which signal attenuation along the cable will be calculated.

As indicated at 1004 in FIG. 10, a process loop may be performed with respect to each "point of interest", where a point of interest is a point in space (in the building in which the wireless network is to be installed) for which it is desired to determine or estimate what level of signal coverage (signal strength) will be provided by the leaky cable. Within the process loop indicated by step 1004, a nested process loop may be performed for each segment of the proposed leaky cable layout, with the nested process loop being indicated by step 1006. The cable segments, as noted above, are as indicated by the straight line segments shown in the display (FIG. 11). In the nested process loop, a metric, which will be referred to as a "shortest radio distance metric", is calculated for the current cable segment with respect to the current point of interest. Calculation of the shortest radio distance metric is indicated at step 1008 within the nested process loop, and proceeds as follows:

First, the nearest point on the current segment to the current point of interest is determined.

Second, signal attenuation along the cable from the start point to the nearest point is calculated. This may be done using the proposed cable layout and signal source location as indicated by the angled line (1102) in FIG. 11 and the location of the signal source block (1114 in FIG. 11). The calculation of signal attenuation along the cable may use an attenuation constant that may be provided by the manufacturer of the leaky cable as part of the technical specifications for the leaky cable.

Third, the attenuation in free space is calculated between the nearest point on the current segment and the current point of interest. This quantity may be calculated in accordance with conventional practices. In some cases, in some embodiments, the calculation of "free space" attenuation may also take into account objects located between the nearest point on the current segment and the current point of interest, and may thus take into account the additional attenuation due to the object. In some embodiments, calculations may be performed relative to points other than the nearest point on the current segment, if an object is present between the closest point on the current segment and the current point of interest, to determine whether the other points result in a smaller radio distance metric because there may be no object between the other point on the current segment and the current point of interest.

Fourth, the shortest radio distance metric is calculated as the sum of the free space attenuation and the attenuation along the cable.

At 1010 in FIG. 10, the cable segment having the smallest value for its shortest radio distance metric is selected to be the cable segment that is likely to produce a dominant level of signal irradiation with respect to the current point of interest. (A cable segment produces a "dominant" level of signal irradiation with respect to a point of interest if the level of irradiation estimated to be produced by the cable segment for the point of interest is greater than the level of irradiation estimated to be produced by any other cable for the point of interest.)

To provide some examples, consider first the point of interest represented by cross-mark 1116 in FIG. 11. This point of interest is equidistant from the cable segments represented respectively by straight line segments 1104 and 1106, so that the free space attenuation from those two cable segments to the point of interest is likely to be the same. Since the cable segment represented by straight line segment 1104 is closer to the signal source (indicated at 1114; i.e., the start point) than the cable segment represented by straight line segment 1106, the attenuation along the cable to the nearest point of the first cable segment (represented at 1104) to the point of interest will be less than the attenuation along the cable to the nearest point of the second cable segment (represented at 1106) to the point of interest. Consequently the first cable segment will have the smaller value for its shortest radio distance metric and will be determined to be the dominant cable segment.

In a second example, consider the point of interest represented by cross-mark 1118 in FIG. 11. This point of interest is much closer to the second cable segment (indicated at 1106) than to any of the other cable segments. Consequently, the free space attenuation to the point of interest is much less for the second cable segment, which will be determined to be the dominant cable segment.

At 1012, as part of the outer process loop indicated by step 1004, the estimated effective received power level is calculated for the current point of interest. This calculation is performed by subtracting the following three quantities from the proposed input power level for the leaky cable:

(1) Coupling loss from the inner conductor to the outer cable shield; this is a constant that is likely to be provided by the manufacturer of the leaky cable as part of the technical specifications for the cable.

(2) Attenuation along the cable from the start point to the closest point (on the dominant segment) to the current point of interest.

(3) Attenuation in free space from the closest point (on the dominant segment) to the current point in interest.

It will be appreciated that the process of FIG. 10 may incorporate functions of both the data input software 118 (FIG. 1) and the RF planning software 122, and/or that the estimated received power levels at the points of interest may be provided as an input to an RF planning function for a wireless data network.

Although the system has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A method of computer-assisted modeling of a leaky coaxial cable signal source in a wireless data network comprising:

displaying a segmented line formed of a plurality of straight segments connected end-to-end on a display screen, said line representing a layout of the leaky coaxial cable, and each of said segments representing a respective cable segment of said cable;

selecting a point of interest spaced from the line of the layout of the cable;

determining a one of said cable segments that is likely to produce a dominant level of irradiation with respect to the point of interest by determining for each cable segment a shortest radio distance metric with respect to the point of interest; and generating a signal pattern, from said determined one of said cable segments, of the signal coverage provided by the cable with respect to the line of the layout of the cable.

2. A method according to claim 1, wherein determining the shortest radio distance metric comprises determining a closest point on each cable segment to the point of interest.

3. A method according to claim 2, wherein determining the shortest radio distance metric further comprises calculating first signal attenuation along the line of the layout of the cable from a start point on the line to said closest point on each cable segment and calculating second signal attenuation resulting from spatial separation between the point of interest and said closest point on each cable segment.

4. A method according to claim 3, wherein the generating step comprises calculating an estimated effective received signal power level at the point of interest.

5. A method according to claim 4, wherein said calculating an estimated effective received signal power level comprises subtracting from an input signal power level at said start point: (a) said first signal attenuation along the line of the layout of the cable from said start point to the closest point on said determined one of said cable segments; (b) said second signal attenuation resulting from spatial separation between the point of interest and said closest point on said determined one of said cable segments; and (c) a coupling loss constant for said cable.

6. A method according to claim 5, further comprising:

providing said calculated estimated effective received signal power level as an input to an RF planning function for the wireless data network.

7. A method according to claim 1, wherein the generating step comprises calculating an estimated effective received signal power level at the point of interest.

8. A method according to claim 7, further comprising:

providing said calculated estimated effective received signal power level as an input to an RF planning function for the wireless data network.

9. A method according to claim 3, wherein the start point comprises the location, on the line of the layout of the cable, of a signal source that powers the cable.

10. A computer readable media comprising software algorithms of computer-readable code that can be executed on a processor, the algorithms comprising:

an algorithm for displaying a segmented line formed of a plurality of straight segments connected end-to-end on a display screen, said line representing a layout of a leaky coaxial cable signal source in a wireless data network, and each of said segments representing a respective cable segment of said cable;

an algorithm for selecting a point of interest spaced from the line of the layout of the cable;

an algorithm for determining a one of said cable segments that is likely to produce a dominant level of irradiation with respect to the point of interest by determining for each cable segment a shortest radio distance metric with respect to the point of interest; and an algorithm for generating a signal pattern, from said determined one of said cable segments, of the signal coverage provided by the cable with respect to the line of the layout of the cable.

11. The media of claim 10, wherein the algorithm for determining the shortest radio distance metric comprises an algorithm for determining a closest point on each cable segment to the point of interest.

12. The media of claim 11, wherein the algorithm for determining the shortest radio distance metric further comprises an algorithm for calculating first signal attenuation along the line of the layout of the cable from a start point on the line to said closest point on each cable segment and an algorithm for calculating second signal attenuation resulting from spatial separation between the point of interest and said closest point on each cable segment.

13. The media of claim 12, wherein the algorithm for generating comprises an algorithm for calculating an estimated effective received signal power level at the point of interest.

14. The media of claim 13, wherein the algorithm for calculating an estimated effective received signal power level comprises an algorithm for subtracting from an input signal power level at said start point: (a) said first signal attenuation along the line of the layout of the cable from said start point to the closest point on said determined one of said cable segments; (b) said second signal attenuation resulting from spatial separation between the point of interest and said closest point on said determined one of said cable segments; and (c) a coupling loss constant for said cable.

15. The media of claim 14, further comprising an algorithm for providing said calculated estimated effective received signal power level as an input to an RF planning function for the wireless data network.

16. The media of claim 10, wherein the algorithm for generating comprises an algorithm for calculating an estimated effective received signal power level at the point of interest.

17. The media of claim 16, further comprising an algorithm for providing said calculated estimated effective received signal power level as an input to an RF planning function for the wireless data network.

18. The media of claim 12, wherein the start point comprises the location, on the line of the layout of the cable, of a signal source that powers the cable.

\* \* \* \* \*